3,501,397
REMOVAL OF ELEMENTAL SULFUR FROM PETROLEUM OIL CONTAMINATED WITH SULFUR

William H. Thompson, St. Louis, Mo., and Eldred E. Young, Concord, Calif., assignors to Shell Oil Company, New York, N.Y., a corporation of Delaware
No Drawing. Continuation-in-part of application Ser. No. 684,507, Nov. 20, 1967. This application Mar. 21, 1969, Ser. No. 809,376
Int. Cl. C10g 29/28
U.S. Cl. 208—236                     3 Claims

ABSTRACT OF THE DISCLOSURE

A method of purifying elemental sulfur contaminated oil separated and recovered from sulfur-oil slurries by contacting such elemental sulfur contaminated oils with an aqueous solution containing polysulfide forming compounds and preferably ammonium polysulfide forming compounds, said solution having preferably a pH above 7.

---

The present invention relates to a new and novel process for removing elemental sulfur particles from elemental sulfur contaminated petroleum oils used in preparation of sulfur-oil slurries for pipeline transportation in which the sulfur and oil are separated into their component parts at the terminal end of the line and thereafter each component is purified. More particularly, the invention is directed to a process of removing dissolved and entrained elemental sulfur from sulfur contaminated crude oil, said crude oil being used as a carrier vehicle for making sulfur-oil slurries for pipeline transportation contacting and treating such a contaminated oil with an aqueous solution containing a polysulfide forming compound, preferably having a pH of at least 7.

CROSS-REFERENCE TO RELATED APPLICATIONS

This application is a continuation-in-part of copending application Ser. No. 684,507, filed Nov. 20, 1967.

BACKGROUND OF THE INVENTION

It is well known in the art that very small amounts of naturally occurring sulfur and sulfur compounds are generally present in petroleum oils or are formed due to chemical refinement of oils, such as by sulfuric acid treatment of oils, and that these sulfur and sulfur compounds can be effectively removed by chemical processing such oils with ammonia or alkali compounds, e.g., alkali metal hydroxide and the like. However, these methods or other related methods known in the art are either ineffective and are quite costly for removing elemental sulfur from oils which have initially been contaminated with large amounts [0.3%–5% or, more specifically, (0.5%–1.5%)] of elemental sulfur generally due to slurring sulfur with the oil. Oil contaminated with such large amounts of elemental sulfur must be effectively treated to remove essentially all of the entrained sulfur prior to processing such oils into industrial products such as gasoline, fuel oils, lubricating oil, etc. Also the presence of sulfur in oil products causes corrosion, objectionable odors, air pollution, etc., and, therefore, its removal from the oil is essential. Oils under discussion become contaminated with such large amounts of elemental sulfur particularly when such oils are used as carrier vehicles in sulfur-oil slurry preparation for pipeline transportation of sulfur as described in the Redcay U.S. patent 2,798,772 or the Every U.S. Patent 3,339,985. Although these references, e.g., the Redcay patent, describe methods of separating the oil from the sulfur at the terminal end and thereafter purifying by chemical means the sulfur by removing any dissolved or entrained oil therefrom by solvent treatment, no mention is made of purifying the carrier, namely the oil. Available art is lacking on means for purifying oil carriers used in pipeline transportation of sulfur as a sulfur-oil slurry.

An object of the present invention is directed to a process for removing sulfur from sulfur contaminated oils.

Still another object of the present invention is directed to a process for removing elemental sulfur from elemental sulfur contaminated petroleum oil.

Also, it is an object of the present invention to purify sulfur-contaminated crude oil and fractions thereof by chemically treating the oil and fractions thereof with a reactive aqueous solution containing polysulfide forming compounds capable of extracting from the oil any entrained or dissolved elemental sulfur present therein.

Other objects will become apparent during the following discussion of the invention.

SUMMARY OF THE INVENTION

Now in accordance with the present invention it has been found that elemental sulfur can be separated effectively from crude oil and fractions thereof containing from about 0.3% to about 5% and generally between about 0.5% and 1.5% of elemental sulfur, by contacting such sulfur contaminated oils with an aqueous solution containing polysulfide forming compounds such as hydrogen polysulfide and/or ammonium polysulfide forming compounds, for a period of time and under controlled temperature conditions to effect a reaction between the elemental sulfur dispersed or solubilized in the oil and the polysulfide forming compounds present in the aqueous solution so that on separation of the oil phase from the aqueous phase, the sulfur has been transferred in the latter phase where it is present as a polysulfide. Elemental sulfur can then be recovered from this aqueous polysulfide phase by any suitable means such as heating the solution thereby effecting precipitation of sulfur and the purified sulfur-free oil can be processed and used as desired. The aqueous solution containing some polysulfide compounds can be recycled and contacted with freshly sulfur contaminated oil and the refining process can be thus continued.

By the process of this invention elemental sulfur contaminated oils having a sulfur content of from about 1% to about 2% recovered from sulfur-oil slurries can be reduced to values of less than 0.01% sulfur or even less. It is to be clearly understood that the process of the present invention relates to removal of elemental sulfur contaminants from oils contaminated by direct contact with a large amount of sulfur and is concerned with removal of sulfur in chemical form normally present in unrefined crude oils or fractions thereof.

The ratio of the sulfur contaminated oil to the contacting and treating aqueous solution can be varied over wide limits of from 2:1 to 1:20 and preferably between 10:1 and 5:1, respectively, and the treatment or reaction can be carried out at ambient temperatures or elevated temperatures, but preferably below 200° F. The aqueous phase can be separated from the oil phase by any suitable means such as gravity settling, centrifuging, etc. The aqueous polysulfide solution on separation and recovery can be decomposed by suitable means such as by heating in a closed vessel or under nitrogen blanket to exclude air to effect precipitation and recovery of elemental sulfur therefrom. Thus, on heating at elevated temperatures, liquids or granular solid yellow sulfur can be precipitated from the solution and thereafter removed. When necessary or desirable, the treated oil can be further contacted with additional amounts of the aqueous treating solution to effect removal of any sulfur which has not been removed by the initial treatment and the process can be repeated as necessary until essentially all of the entrained and dissolved elemental sulfur is removed. Thus, a sulfur contaminated oil can be treated by the process of this invention so that the sulfur content of the treated oil is below about 0.01% and such oils can be safely processed in refineries to produce industrial products such as gasoline and lube oils, etc.

Aqueous polysulfide forming solutions include water solutions containing ammonia and dissolved hydrogen sulfide, or water solutions containing ammonium hydroxide and hydrogen sulfide or water containing ammonium polysulfide produced by the methods described in U.S. patent 2,722,473, and the polysulfide compounds should be present in amounts so that the solution has a pH of at least 7.

PREFERRED EMBODIMENT OF THE INVENTION

To summarize, the steps in removing elemental sulfur present as contaminants in oils comprises:

(1) Contacting, treating and reacting the elemental sulfur contaminated oil with an aqueous solution containing a polysulfide forming compound, said solution having a pH of at least 7, preferably at a temperature and for a period of time sufficient to effect a chemical reaction between the elemental sulfur and the aqueous solution containing polysulfide forming compound;

(2) Separating the oil phase from the aqueous phase and further treating the separating oil phase if necessary by the process of step (1);

(3) Optionally treating the separated aqueous phase containing formed polysulfides, as a result of the reaction of step (1) so as to effect a breaking down of the polysulfides to elemental sulfur, and other by-products, and (4) Removing the sulfur from (3) by filtration, centrifuging, gravity settling, etc.

The oil purification of sulfur contaminated crude oil is illustrated by the following example.

Crude oil used as a carrier vehicle in pipeline transportation of solid sulfur particles in slurry form was separated from the sulfur at the terminal end of the line by conventional mechanical means, e.g., centrifuging and found to contain from about 1.0% to 1.5% elemental sulfur entrained in the oil. About 10 parts of the sulfur contaminated crude oil was contacted and treated with about 1 part of a saturated aqueous solution having a pH above 7 containing a mixture of ammonium hydroxide and dissolved hydrogen sulfide, at ambient temperature for about ½ hour. After about ½ hour of contacting and treatment the oil phase was separated from the aqueous phase and the oil phase was found to contain about 0.01% sulfur. The aqueous phase, after separation from the oil phase, can be heated to about 240° F. under a nitrogen blanket to form elemental sulfur which can be recovered from the solution by filtration.

Crude oil containing 1–2% elemental sulfur resulting from sulfur-oil slurry separation was also treated with a saturated aqueous solution containing ammonium sulfide and concentrated ammonium hydroxide and on separation of the oil phase from the aqueous phase, the elemental sulfur content of the oil phase was found to have been reduced to less than 0.01%.

The process of the present invention is particularly applicable to purifying and refining sulfur contaminated crude oil and fractions thereof used as carrier vehicles in pipeline transportation of sulfur-oil slurries and as a result of which the oils become contaminated with elemental sulfur which must be removed prior to refinery processing in order to produce industrial products such as gasoline, fuel oil, lubricating oil and other industrial products.

The foregoing description of the invention is merely intended to be explanatory thereof. Various changes in the details of the described method may be made within the scope of the appended claims without departing from the spirit of the invention.

We claim as our invention:

1. A method of purifying elemental sulfur contaminated petroleum oil recovered from a sulfur-oil slurry whereinafter the purification of the sulfur content of the oil is reduced from about 0.3% to about 5% to less than 0.01%, comprising contacting and treating the oil with an aqueous solution containing an ammonium polysulfide having a pH above 7, separating the oil from the aqueous phase and recovering the low-sulfur phase from the aqueous phase.

2. The process of claim 1 wherein the ratio of the oil phase to the aqueous phase varies from 20:1 to 1:20, respectively.

3. The process of claim 1 wherein the two phases are separated and the aqueous phase is processed to recover the elemental sulfur from said aqueous phase.

References Cited

UNITED STATES PATENTS 1,357,224  11/1920  Cobb _____ 208—236

DELBERT E. GANTZ, Primary Examiner

J. M. NELSON, Assistant Examiner